March 5, 1957   A. D. GUNDERSON   2,783,688
PIVOTED KNEE
Filed Oct. 7, 1954   3 Sheets-Sheet 1
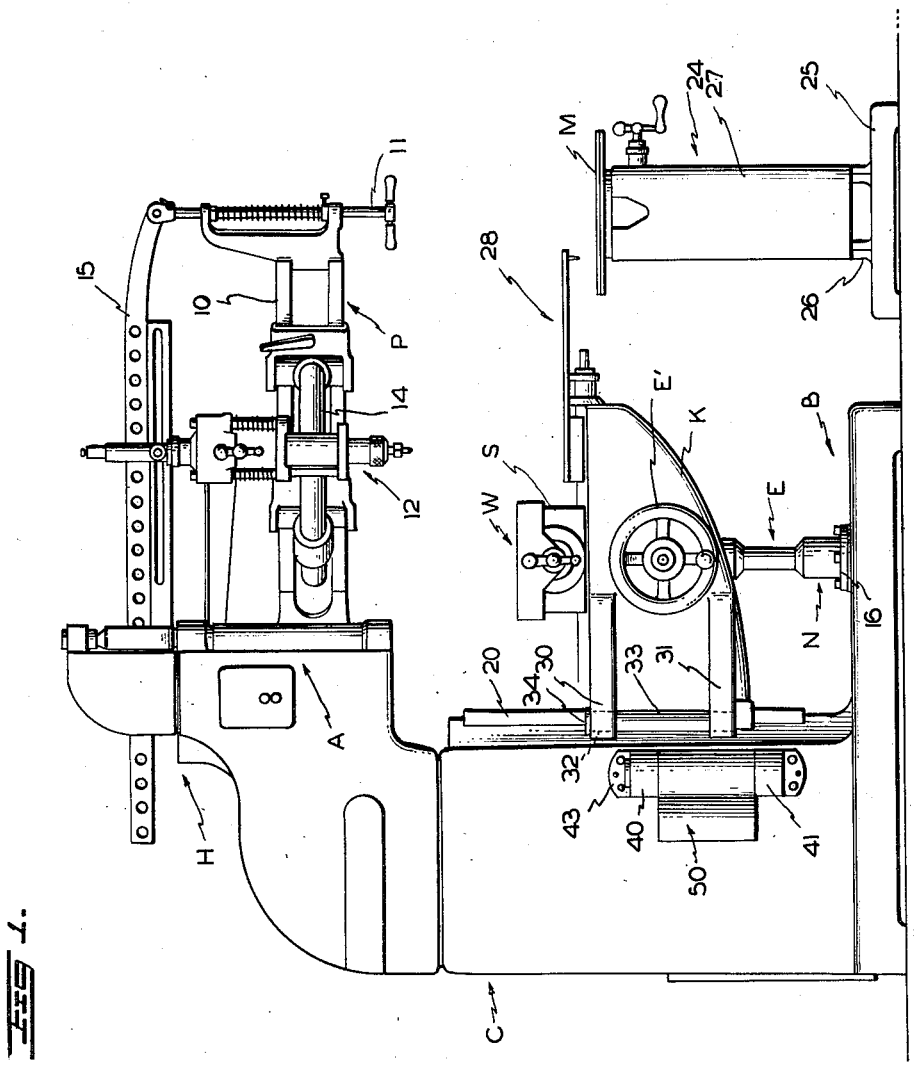
INVENTOR:
Allen D. Gunderson
BY Peck + Peck
ATTORNEYS

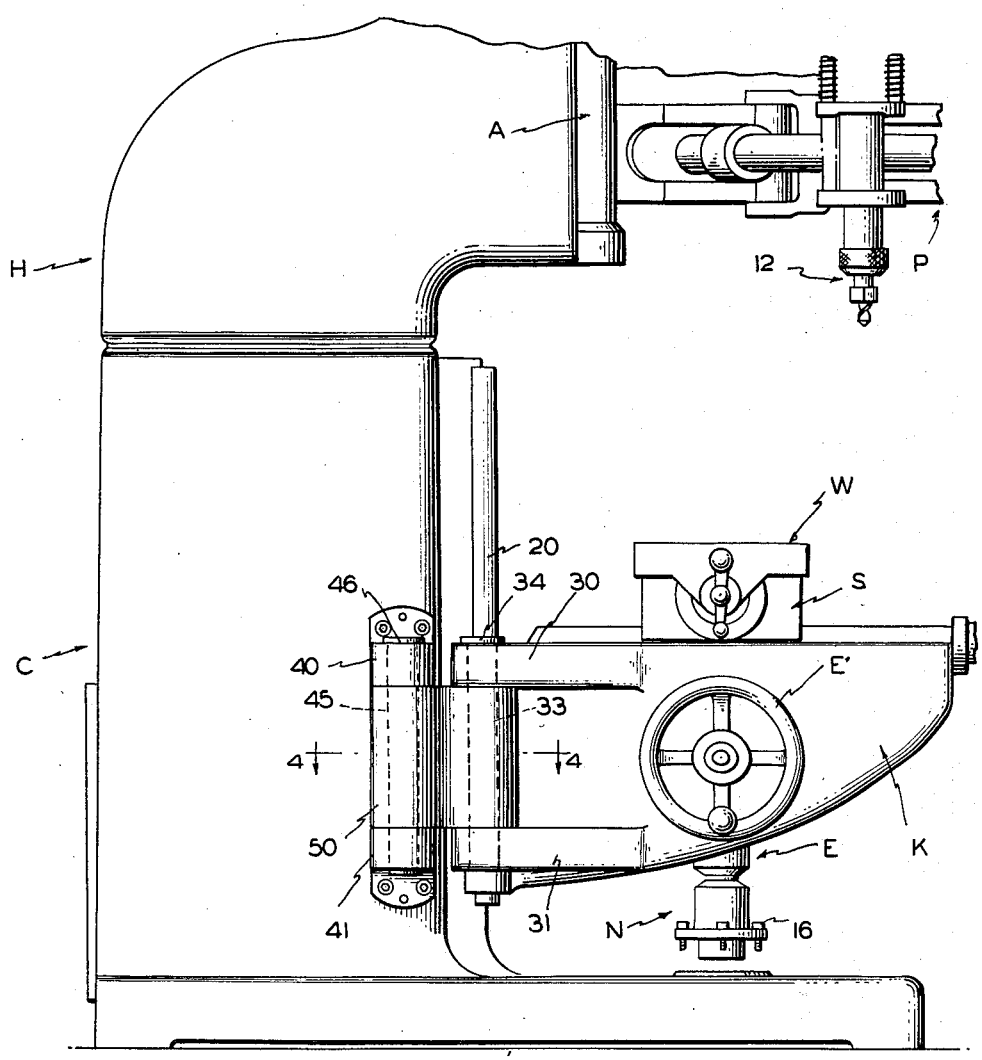
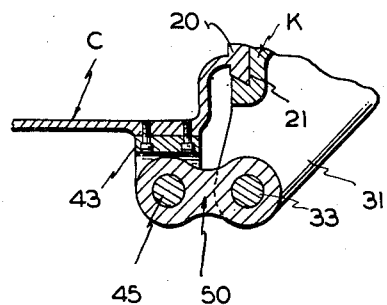

March 5, 1957 A. D. GUNDERSON 2,783,688
PIVOTED KNEE
Filed Oct. 7, 1954 3 Sheets-Sheet 3
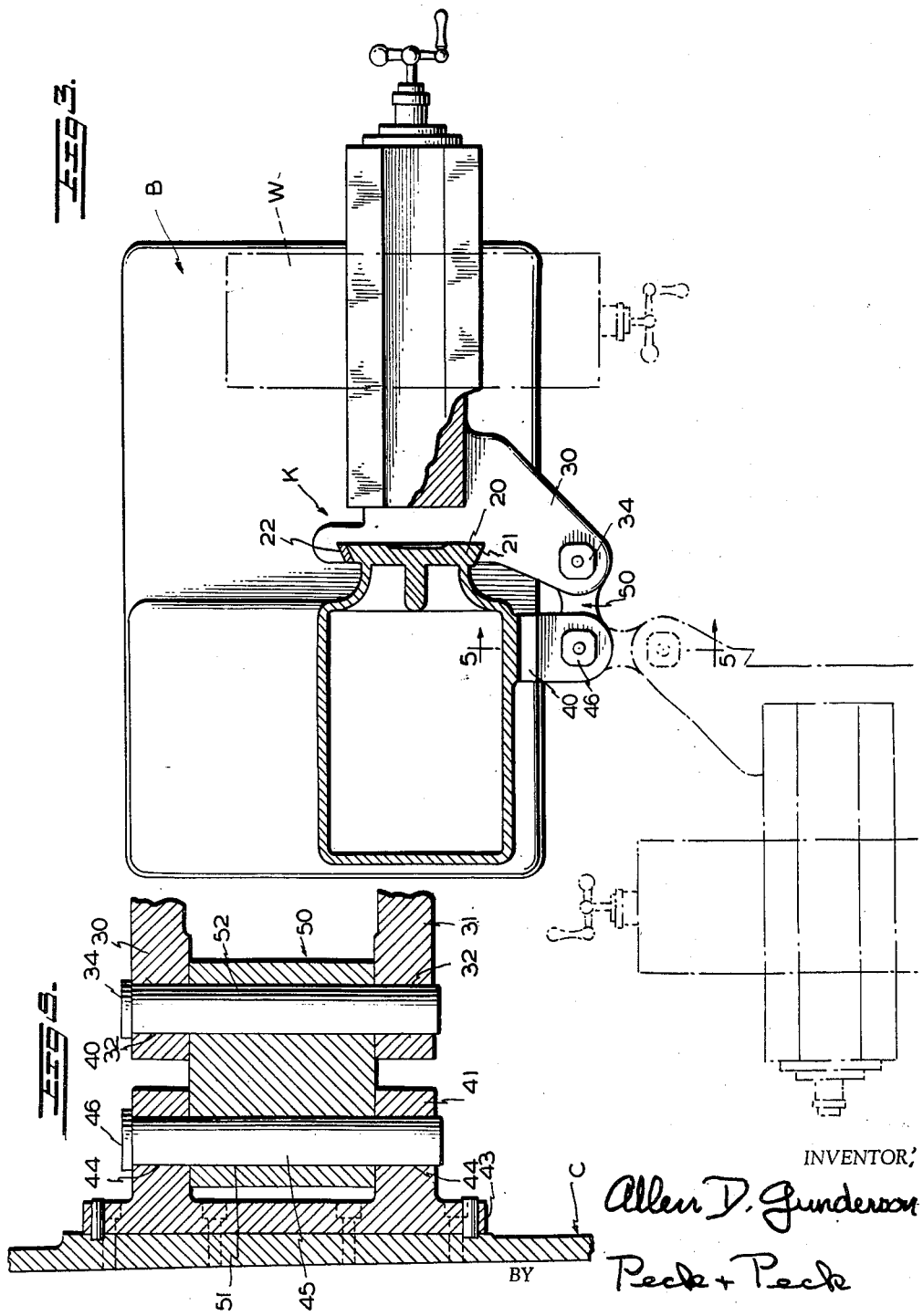
INVENTOR.
Allen D. Gunderson
BY Peck + Peck
ATTORNEYS.

United States Patent Office 2,783,688
Patented Mar. 5, 1957

2,783,688
PIVOTED KNEE

Allen D. Gunderson, Racine, Wis., assignor to George Gorton Machine Co., Racine, Wis., a corporation of Wisconsin Application October 7, 1954, Serial No. 460,898

6 Claims. (Cl. 90—58)

This invention relates to pantograph milling machines of the types embodying a vertically adjustable knee, saddle and worktable assembly; and the nature and objects of the invention will be readily recognized and understood by those skilled in the art from the following detailed description and explanation of the accompanying drawings illustrating what I at present consider to be a preferred embodiment or mechanical expression of the invention from among various other forms, expressions, embodiments, modifications, constructions and combinations of which the invention and its several features are capable within the broad spirit and scope thereof as defined by the claims hereto appended.

With milling machines of the pantograph type for milling, engraving and the like operations from a master by tracer control of the cutter spindle through a pantograph mechanism, in which a vertically adjustable knee, saddle and worktable assembly is mounted at the forward side of a column structure below the pantograph mechanism, the range of sizes of the work pieces upon which the milling or engraving operations can be performed is substantially limited. In the usual design and organization of such types of machines the knee, saddle and worktable assembly is located in position spaced below the pantograph mechanism and the cutter spindle mounted thereon so that aside from the weight limitations on the work piece that can be handled by the knee, saddle and worktable assembly, there is the limitation on the size of the work piece that the machine can work upon due to the relatively limited vertical space between the worktable and the cutter spindle, even with the knee, saddle and and worktable assembly in its maximum lowered position. It is frequently desirable to perform tracer controlled milling or engraving operations on very large size work pieces, such as large and heavy die blocks or rolls but, with the prevailing designs and organizations of such types of machine because of the work size limitations inherent in them, it is impossible to utilize the machines for milling or engraving operations on these larger size work pieces.

It is a general object of my invention to increase the work piece size capacity of a milling or the like machine of the type having a vertically adjustable knee, saddle and worktable assembly to thereby enable such machine to work upon larger size and heavier work pieces than possible with the knee, saddle and worktable assembly in normal position and functioning to mount and adjust a work piece for milling operation by the machine.

Another object is to increase the work piece size capacity of such type machines by providing a knee, saddle and worktable assembly which can be readily displaced to an inactive position on the machine to increase the size of the work piece receiving space thereof to thereby enable the machine to then work upon large size work pieces, and by which the knee, saddle and worktable assembly may, when desired, be readily quickly restored to active position for functioning on the machine in the normal manner.

A further object of the invention is to provide a pivotal mounting for a knee, saddle and worktable assembly by which such assembly may be readily swung as a unit horizontally about a vertical axis between an active position for normal functioning on the machine and an inactive position on the machine removed from and thereby increasing the size of the work piece receiving space in the machine.

Another object is to provide a pivotal or hinge mounting arrangement for a knee, saddle and worktable assembly by which such assembly may be temporarily pivotally connected to the column structure of the machine and swung laterally horizontally from its normal position to an inactive position at the side of the column and may be swung back to normal position and the hinge mounting uncoupled and completely disconnected from the column for restoration of the knee assembly to normal vertically adjustable connection with the column, in vertically adjustable relationship on the column but completely disconnected from its pivotal connection with the column.

Another object is to provide such a hinge mounting for the knee, saddle and worktable assembly of a milling machine in which the elevate screw for the knee may be utilized for adjusting such assembly to positions for pivotal connection with the column hinge mounting, and then itself disconnected from the machine for displacement with the knee assembly to inactive position clear of the work piece receiving space of the machine.

And a further object is to provide a mechanically simple but strong hinge mounting on the column structure and knee assembly of a milling or the like machine by which the knee assembly of such a machine may be quickly connected into and disconnected from such hinge mounting on the column structure by simple manual operations without the use of special tools.

With the foregoing and various other objects, features and results in view which will be readily apparent from the following description and explanation, my invention consists in certain novel features in design, construction, and forms and in combinations of elements, all as will be more fully and particularly referred to and described hereinafter.

Referring to the accompanying drawings in which similar reference characters refer to corresponding parts and elements throughout the several figures thereof:

Fig. 1 is a view in side elevation of a pantograph type milling machine embodying the knee, saddle or pivotal mounting of the invention showing the knee in its disconnected, unhinged and normal position and operative relationship at the forward side of the vertical column of the machine.

Fig. 2 is a view in side elevation of the vertical column and the knee, saddle and worktable assembly of the machine of Fig. 1 showing the knee hinge mounting in connected relation for lateral horizontal swinging of the knee, saddle and worktable assembly to inactive position at one side of the vertical column.

Fig. 3 is a horizontal sectional view through the vertical column showing the knee, saddle and worktable assembly in the hinged or pivotally connected relation of Fig. 2 with the knee, saddle and worktable assembly being shown in dotted outline in its inactive position swung to one side of the vertical column.

Fig. 4 is a fragmentary detail horizontal section through the connected hinge mounting taken as on the line 4—4 of Fig. 2.

Fig. 5 is a detail fragmentary vertical section through the connected hinge mounting taken as on the line 5—5 of Fig. 3.

A tracer controlled, pantograph type milling machine embodying the separable and detachable pivotal or hinge mounting of the invention by which the knee, saddle and worktable assembly may be swung from normal position to inactive position converting the machine to handle larger size work pieces is disclosed in the accompanying drawings as an example of a specific expression and adaptation of the invention. The example milling machine happens to include a tracer controlled pantograph mechanism of the three-dimensional type, although it is to be understood that the application of the invention is in no wise limited or restricted to machines having such type of pantograph mechanisms as the invention is equally adapted to machines having pantograph mechanisms of the two-dimensional type, as well as to milling and the like types of machines other than pantograph types where the conditions and problems overcome by the invention are encountered. The machine of the example hereof is of the so-called vertical column type familiar in the art, but the invention contemplates and includes machine frames or supporting structures other than those of the true vertical column type and the term "vertical column" or "column" herein and in the appended claims is used in a broad, generic sense to include various other forms and types of machine frame and supporting structures.

In the machine of the illustrated example incorporating the invention, referring now to the drawings with particular reference to Fig. 1 thereof, the machine organization includes a vertical column C mounted upon a horizontal forwardly extending base B with the column C providing at the upper portion thereof a forwardly extending pantograph mounting head portion generally indicated by the reference character H. A pantograph mechanism P is pivotally mounted and hung from the forward side of the head H for horizontal swinging about a vertical axis by a pivot member A with the pantograph thus disposed extending horizontally and forwardly across the space at the forward side of the column C. The pantograph mechanism P of the example is of the three-dimensional type well known in the art and includes a tracer arm 10 which mounts a vertically disposed tracer 11 with a cutter spindle 12 mounted in vertically disposed position on another arm or link 14 of the pantograph mechanism, as will be readily understood by those skilled in this art. In this instance, both the tracer 11 and the cutter spindle 12 are vertically displaceable through the medium of a bar 15 for following a master and reproducing from it in the third dimension.

The forward side of the vertical column C provides the usual vertically disposed dovetail slideway 20 thereon for slidably receiving a horizontally and forwardly disposed knee K which is vertically adjustable upwardly and downwardly thereon. The knee K is supported from the base B by the usual elevate screw E which is rotatably received in a nut assembly N attached to the base B by the cap screws 16 in the usual manner. The elevate screw E has the usual rotatable bearing engagement (not shown) with the knee K so that proper directional rotation of such screw will raise and lower the knee on the slideway 20 supported from the base B. It is not believed necessary to make detailed disclosures herein of such elevate screw mounting and arrangement in view of the specific knowledge of the art with respect thereto. The elevate screw E is selectively rotatable in the desired direction by a hand wheel E' located at one side of the knee and having the usual spindle and beveled gear connection (not shown) with the upper end portion of the elevate screw E within the knee.

The rear vertical side of the knee K is provided with the usual vertically disposed dovetail groove 21 therein, referring now to Fig. 3, which slidably receives the dovetail slideway 20 on the front face of the vertical column C, with the knee thereby constrained to straight line movements upwardly and downwardly thereon. The usual removable gib 22 is provided in the groove 21 at one side thereof in slidable engagement with the adjacent edge of slideway 20 for releasably clamping and locking the knee in any position of vertical adjustment. It will thus be apparent that by removing the gib 22 by sliding it vertically upwardly and lifting it completely from the groove 21 in the knee K, the knee will then be released for withdrawal from laterally interlocked, slidable relation on the column slideway 20.

A saddle S is slidably mounted in the usual manner on a way on the upper side of the knee K and is constrained by that way for straight line movements crosswise of the machine. A worktable W is slidably mounted on suitable ways across the upper side of saddle S in the manner familiar in the art and is constrained by such ways for straight line movements longitudinally in the conventional manner. The worktable W is adapted to mount and have fixed thereon a work piece (not shown) for tracer controlled milling operations from the cutter spindle 12 through the pantograph mechanism P. It will be apparent that with this machine organization of this type as so far described, the only available work piece receiving space is provided between the upper side of the worktable W and the lower end of a suitable cutter mounted on the cutter spindle 12 in position spaced above the worktable.

These tracer controlled pantograph types of machines generally provide a master or copy table on which the master or copy to be traced by the tracer 11 is placed with such master table being usually supported in proper position located below the tracer 11 from the base B, thus further obstructing the available space below the pantograph mechanism P and cutter spindle 12.

Following the teachings of the present invention by which the work piece receiving space provided by the machine is substantially increased, a separate and movable master or copy table assembly is provided which may be moved and located independently of the machine and the base B. Such separate and independently movable master table assembly 24 is shown in Fig. 1 and includes a base 25 having a vertical column 26 thereon on which is vertically slidably mounted a vertical post 27 which mounts and supports on the upper end thereof a horizontally disposed master or copy table M. This master table assembly 24 is moved to proper position below and relative to the tracer 11 of the pantograph mechanism P so that the operator may trace a master or copy on table M with the tracer 11 to thereby effect, through the pantograph mechanism P, movement of the cutter spindle 12 over a work piece on work table W in scaled reproduction of the master. Preferably, for the purpose of locating the assembly 24 and the master or copy table M thereof in proper position relative to the machine and the tracer 11 of pantograph mechanism P, a gage assembly 28 is provided for mounting on the knee K, as will be clear by reference to Fig. 1.

In accordance with the invention a separable pivot or hinge mounting is provided identified generally by the reference character G, for the knee K by which this knee, with the saddle S and the worktable W, may be laterally horizontally swung as a unit assembly from its normal position mounted on base B and vertically slidably engaged on the slideway 20 at the forward side of the vertical column C to inactive position at the side of said column and on which it may be swung from such inactive position and restored to its normal position in the machine organization. The pivot or hinge mounting G in its preferred form, as illustrated herein, provides for ready attachment of the knee K into hinged or swinging coupling therewith for displacement thereon to inactive position and for disconnection and uncoupling therefrom when the knee has been swung back and restored to its normal position in operative mounting on the base B and the slideway 20 of the vertical column C.

In carrying out the invention, parallel horizontally disposed and rearwardly extending hinge arms 30 and 31 are formed or provided on and along the rear portion of one side of the knee K, in this instance the left-hand side thereof when facing the machine. These hinge arms 30 and 31 are spaced apart vertically with the arm 30 adjacent the upper side and the arm 31 spaced therebelow adjacent the lower side of the knee K. The hinge arms 30 and 31 are, as in the present example, preferably formed or cast integrally with the side wall of the knee K. The arms 30 and 31, as will be clear by reference to Fig. 3 in particular, extend laterally outwardly from the side of the knee K and are inclined rearwardly to extend at their outer ends a distance rearwardly from the knee K and inwardly relative to the slideway 20 on column C. In the normal operative association of the knee, saddle and worktable assembly in position vertically slidably mounted on the slideway 20, the arms 30 and 31 are unconnected with other structure and are inactive and ride idly with the knee K in the vertical adjustments upwardly and downwardly thereof. The outer rear ends of the hinge arms 30 and 31 are provided with axially aligned vertical bores 32 therethrough and a pivot or pintle pin 33 is removably mounted in and through said bores 32 in position extending between the arms 30 and 31, as shown in Fig. 1. The pin 33 is provided at its upper end with a head 34 by which the pin is supported in position on the arms 30 and 31. This is the normal inactive position of the pin 33 with the knee assembly in its normal operative position, as shown in Fig. 1.

The separable pivot or hinge mounting G for knee K of which the arms 30 and 31 and the pin 33 form a part, is completed by the mounting on the same side of the vertical column C as the side on which arms 30 and 31 are mounted on the knee K, of spaced hinge ears 40 and 41 with a hinge body 50 pivotally swingably mounted and confined therebetween. The hinge ears 40 and 41 may, as in this example, be formed on a base 43 bolted or otherwise attached in vertically disposed position on the side of the column C with the ears 40 and 41 vertically spaced apart in parallel relation and extending laterally horizontally therefrom in planes generally normal to the plane of the column side wall but parallel with the planes of the hinge arms 30 and 31 on the knee K.

The column mounted hinge ears 40 and 41 are formed with vertical bores 44 therethrough which are in axial alignment and which receive a pivot or pintle pin 45 extending therethrough across and between the hinge ears. The hinge body 50 is pivotally mounted on the pin 45 for horizontal swinging thereon as an axis by means of a bore 51 through which the pin 45 extends with the hinge body 50 being swingably journaled thereon. The pivot or pintle pin 45 has a head 46 on the upper end thereof by which it is supported on the upper ear 40. Hinge body 50 has a vertical width to substantially occupy the space between the hinge arms 40 and 41 and is of a length to extend radially outwardly therefrom. The hinge body 50 adjacent the outer free end thereof is provided with a vertical bore 52 therethrough parallel with the bore 51 which receives the pin 45 carried by the ears 40 and 41. The spacing or vertical distance between the ears 40 and 41 is substantially the same as the spacing or vertical distance between the outer end portions of the hinge arms 30 and 31, and the vertical depth or width of the hinge body 50 at the outer free portion thereof is also substantially equal to the vertical spacing between the inner sides of the hinge arms 30 and 31 so that hinge body 50 may be swung into position received between hinge arms 30 and 31 with the vertical bore 52 through the hinge body axially aligned with the bores 32 through the outer ends of such hinge arms.

With the foregoing arrangement of the separable or detachable hinge mounting G, the assembly formed of the knee K, saddle S and worktable W is shown in Fig. 1 in its normal conventional position in operative mounting on base B in vertically slidable connection with the slideway 20 on the vertical column C. In this normal position the knee carried hinge arms 30 and 31 are disconnected and uncoupled from the column mounted hinge ears 40 and 41 and the hinge body 42 pivotally mounted thereon. In such position the pivot or pintle pin 33 is mounted and carried in its inactive position in the hinge ears 30 and 31 on the knee K. Thus, the knee, saddle and worktable assembly is in position for normal operation and functioning, being vertically adjustable through the medium of the hand wheel E' and the elevate screw E with the saddle S and the worktable W being adjustable relative to each other and on and relative to the knee in the usual manner familiar in the art.

If, then, it becomes desirable to perform milling operations on a work piece of a size greater than can be received in the space between the worktable W and the cutter spindle 12 when mounted on the worktable W, the machine can be readily converted to increase the work piece receiving space by displacing the knee assembly to inactive position. In order to swing the knee assembly to inactive position the operator first lifts and removes the pivot pin 30 from the hinge arms 30 and 31 on the knee K and then, by the hand wheel E', operates the elevate screw E in a direction to lower the knee to a position with the space between the arms 30 and 31 opposite and aligned with the hinge body 50 on the column C. This hinge body 50 is then swung forwardly into position between the knee hinge arms 30 and 31 with the vertical bore 52 of the hinge body in vertical axial alignment with the bores 32 in the upper and lower hinge arms 30 and 31. The pivot or pintle pin 33 is then inserted downwardly through the aligned bores 32 and 52 with the pin supported in such position by the head 34 seated upon the upper surface of the upper hinge arm 30. Thus, the uncoupled hinge mounting G is connected to pivotally and swingably couple the knee, saddle and worktable assembly to the column C in hinged support on that column for horizontal swinging of the knee assembly thereon. Such coupled position of the hinge mounting G is clearly disclosed in Fig. 2 in connection with Figs. 3, 4, and 5 of the drawings.

After the hinge arms 30 and 31 of the knee K are connected and pivotally coupled to the hinge body 50 mounted on the column C, the operator then detaches the cap screws 16 by which the elevate screw nut N is attached to the base B so that the nut end is released from the base. The disconnected elevate screw and nut is then raised above and clear of the base B to the position as shown in Fig. 2, by rotating the hand wheel W in a direction which would normally lower the knee with the nut N in its position attached to the base B. Upon completion of the raising of the elevate nut N by the screw E, the operator then removes the gib 22 from the dovetail groove 21 to thereby free the knee K for lateral swinging from position with the dovetail slideway 20 received and constrained in the slideway 21. Following removal of the gib 22 and the release of the knee from the column slideway, the operator then merely swings the entire assembly of knee K, saddle S and work table W horizontally on and around the connected hinge mounting G to inactive position at the side of column C, such position being shown in Fig. 3 of the drawings.

Thus, with the knee assembly swung to the inactive position shown in Fig. 3, the entire space between the base B and the cutter spindle 12 at the forward side of the column C is open and unobstructed so that a large size work piece, such as a large die or roll, may, then, by the use of rails or by other means, be moved and secured in position beneath the cutter spindle 12 for the performance of tracer controlled milling operations on the work piece through the pantograph mechanism P under the dictation of a master or copy as such master or copy is traced by the tracer 11. Such master or copy may in the case of very large size work pieces be properly mounted and positioned on the work piece itself or, if desired, a movable copy or master table, such as the table assembly 24, may be set up in proper position and relationship with the work piece, the tracer and the cutter spindle. With the machine converted to increase the work piece size capacity with the knee assembly swung on the hinge mounting to a position at the side of the column C as shown in Fig. 3, it is a very simple procedure which can be carried out by one operator to restore the knee assembly to the normal conventional position as shown in Fig. 1 for operation of the machine on a work piece mounted on the table W. To effect such restoration the operator manually swings the knee assembly from its position, as shown in Fig. 3, to position over base B in front of slideway 20 on the column C with the slideway 20 received in the dovetail groove 21 in the adjacent side of the knee K. The operator then inserts and replaces the gib 22 to its normal operative position in slideway 21 with the knee thereby constrained for conventional vertical sliding displacement on the slideway 20. The operator next attaches the elevate nut N by means of the cap screw 16 into its proper position fixed on base B. The restoration of the knee assembly to its conventional operative relationship in the machine is completed by lifting the pivot pin 33 from position connecting the hinge arms 30 with the hinge body 50 and swinging the hinge body outwardly and rearwardly to position disposed at the side of the column as shown in Fig. 1. The pivot pin 33 may then be reinserted through the bores 32 in the knee hinge arms 30 and 31 to position on and carried by said arms. The assembly of knee K, saddle S, and worktable W is thus restored to normal conventional operation for vertical adjustments upwardly and downwardly through the medium of the hand wheel E′, elevate screw E and elevate nut N.

It will also be evident from the foregoing exemplification of my invention that various other embodiments, modifications, variations, constructions and combinations may be resorted to without departing from the broad spirit and scope of the invention, and hence I do not intend or desire to limit the invention in all respects to the exact and specific disclosures hereof, except as may be required by specific and intended limitation thereto appearing in any of the claims hereto appended.

What I claim is:

1. In combination, in a milling and the like machine; a vertical column structure; a vertically adjustable work supporting knee mounted in normal operative position at the forward side of said vertical column structure; hinge arms on one side of said knee; a hinge body pivotally mounted on the side of said column structure adjacent said hinge arms on said knee; a pivot pin detachably coupling said knee hinge arms with said hinge body for swinging thereon of said knee from normal position at the forward side of said column structure to an inactive position at said side of said column structure; and said pivot pin being mounted for removal to disconnect said hinge arms on said knee from said hinge body on said column structure when said knee is in normal operative position for vertical adjustment thereof at the forward side of the said column structure.

2. In combination, in a milling and the like machine; a supporting structure; a work supporting knee assembly mounted in position at the forward side of said supporting structure in vertically displaceable engagement therewith; vertically spaced, horizontally disposed hinge arms on one side of said knee assembly; a hinge body pivotally mounted for horizontal swinging about a vertical axis on a side of said supporting structure adjacent said hinge arms on said knee assembly; and a removable pivot pin detachably pivotally connecting said hinge arms on said knee assembly with said hinge body for horizontal swinging of said knee thereon from operative position at the forward side of said supporting structure to an inactive position at said adjacent side of said supporting structure.

3. In combination, in a milling and the like machine; a vertical column structure having a vertically disposed dovetail slideway on the forward side thereof; a work supporting knee assembly mounted in normal operative position at the forward side of said column structure having a vertically disposed dovetail groove at the rear side thereof in vertical slidable engagement with said dovetail slideway on said column structure; a removable gib in said groove on said knee assembly for constraining said assembly in vertical slidable engagement with said slideway on said column structure; hinge arms on one side of said knee assembly; a hinge body pivotally mounted in fixed position vertically for horizontal swinging about a vertical axis on the side of said column structure adjacent said hinge arms on said knee assembly; a vertically disposed pivot pin detachably coupling said hinge arms on said knee assembly with said hinge body for horizontal swinging in fixed position vertically thereon of said knee assembly from normal operative position at the forward side of said column structure to an inactive position at the side thereof removed from the space in front of said column structure; and said pivot pin being mounted for removal to disconnect said hinge arms on said knee from said hinge body on said column structure when said knee assembly is in normal operative position to free said knee assembly from said hinge body for vertical adjustments thereof on said column structure independently of said hinge body.

4. In a milling and the like machine, in combination, a base structure; a vertical column structure extending upwardly from said base structure; a work supporting knee assembly mounted on said base structure in vertical sliding engagement with said column structure at the forward side thereof; and a hinge mounting positioned on adjacent sides of said column structure and said knee assembly, said hinge mounting including horizontally disposed hinge arms in fixed positions on said knee assembly, a hinge body pivotally mounted in fixed position vertically on the adjacent side of said vertical column structure for horizontal swinging about a vertical axis, and a removably mounted pivot pin for detachably coupling said hinge body and said hinge arms for horizontal swinging of said knee assembly as a unit from normal operative position at the forward side to inactive position at said adjacent side of said vertical column.

5. In a milling and the like machine, in combination, a base having a vertical column structure extending upwardly therefrom; a knee assembly located in normal operative position at the forward side of said column structure above said base; means detachably connected with said base for supporting said knee assembly therefrom and for vertically adjusting said knee assembly upwardly and downwardly thereon relative to said vertical column structure; a hinge mounting for swingably supporting said knee assembly from said column structure; and said hinge mounting including hinge members on said knee assembly, hinge members on one side of said column structure, and a vertically disposed pivot pin for detachably coupling said hinge members on said knee assembly with said hinge members on said column structure for horizontal swinging of said knee assembly thereon between its normal operative position at the forward side of said column structure to an inactive position at the side of said column structure, and said pivot pin being removable from said hinge mounting to disconnect said hinge members when said knee assembly is in normal operative position at the forward side of said column structure supported by said supporting and vertical adjusting means detachably connected with said base.

6. In combination, a base structure; a vertical column structure extending upwardly therefrom and providing at the forward side thereof a vertically disposed slideway; a knee assembly mounted and supported on said base in vertical sliding engagement on said slideway at the forward side of said column structure; rearwardly and outwardly extending, vertically spaced hinge arms in horizontally disposed positions on one side of said knee assembly; horizontally disposed vertically spaced hinge ears on the side of said vertical column structure adjacent said hinge arms on said knee assembly; a hinge body pivotally mounted in position between said hinge ears on said column structure for horizontal swinging about a vertical axis and having at the outer free end thereof a vertical bore therethrough; a pivot pin removably mounted in the outer ends of said hinge arms on said knee in vertically disposed position extending therebetween; said knee assembly being vertically adjustable to a position with said hinge arms opposite and aligned with said hinge ears; said hinge body being swingable to position with the outer free end thereof located between said hinge arms when said pivot pin has been removed from said hinge arms and the latter are in position aligned with said hinge ears; and said hinge arms on said knee assembly being adapted to be pivotally coupled to said hinge body on said column structure by mounting said pivot pin in position received in and extending through said hinge arms and said vertical bore in the outer free end of said hinge body when said hinge body is swung to position with the outer free end thereof between said hinge arms on said knee assembly.

References Cited in the file of this patent
UNITED STATES PATENTS

| | | |
|---|---|---|
| 128,665 | Sellers | July 2, 1872 |
| 395,196 | Andren | Dec. 25, 1888 |
| 976,754 | Bamford | Nov. 22, 1910 |
| 1,297,463 | Hallenbeck | Mar. 18, 1919 |
| 1,414,486 | Sears et al. | May 2, 1922 |
| 2,650,521 | Steinbrecker | Sept. 1, 1953 |
| 2,677,311 | Campbell | May 4, 1954 |